April 19, 1938.  G. W. CHARTERS  2,114,701
FRUIT WRAP
Filed Dec. 10, 1937
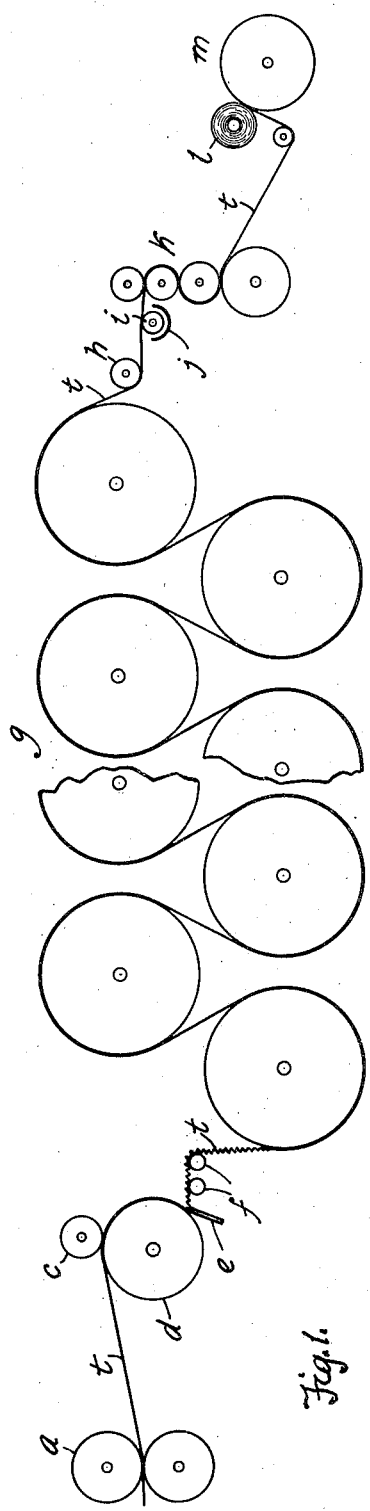
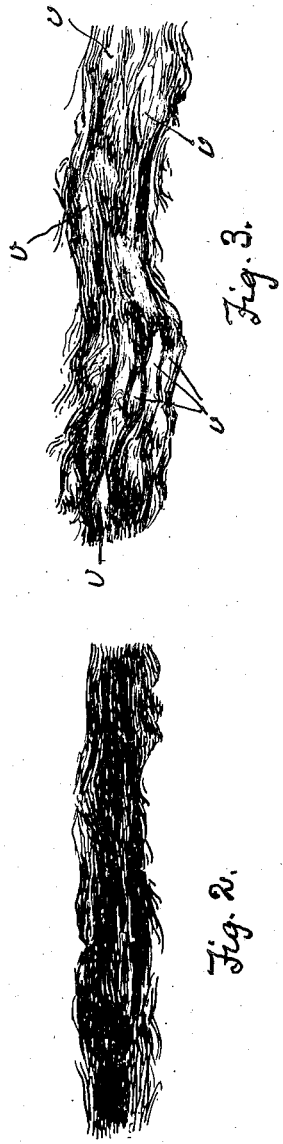
Inventor:
George W. Charters Patented Apr. 19, 1938

2,114,701

UNITED STATES PATENT OFFICE 2,114,701

FRUIT WRAP

George W. Charters, Camas, Wash.

Application December 10, 1937, Serial No. 179,205

8 Claims. (Cl. 91—68)

This application is being filed in continuation in part of my application filed May 8, 1936, Serial No. 78,679.

My invention relates to the industry of shipping fruit, especially apples and pears, wrapped in tissue sheets impregnated with a preservative oil in order to prevent spoiling of the fruit by contamination, such sheets generally being known as fruit wraps; and the purpose of my invention is to provide a fruit wrap made of tissue especially prepared so as to possess inherent properties which eliminate certain objectionable features now existing in the customary fruit wrap, and which are impregnated with the necessary minimum amount of preservative oil without rendering the sheet greasy.

The customary fruit wraps are made of plain tissue that lack softness of web, pliability, elasticity, and absorptivity. Fruit wraps must hold a definite quantity of preservative oil, according to standard requirements fixed by the Department of Agriculture. This impregnation with preservative oil is fixed for practical purposes at approximately $2\frac{1}{10}$ lbs. of oil per ream weight of paper. In other words, the quantity of preservative oil which the fruit wrap sheets should hold has been standardized at approximately 15% to $17\frac{1}{2}$% of the weight of the paper, and at not less than approximately 15% of the weight of the paper.

Lack of pliability in fruit wraps causes them to resist to a considerable extent the wrapping of the fruit in them. In packing apples, for example, it is customary for the packer to place a sheet of fruit wrap in the palm of one hand and pick up an apple with the other, and then, in order to pre-form the wrap to the apple, and thus facilitate the wrapping of the apple in the tissue sheet, the packer throws the apple with some force against the sheet held in the palm of the hand. This action imposes both a tiring muscular exertion upon the arm throwing the apple, also has a tiring effect upon the hand holding the wrapper sheet. And, since fruit wrapping is generally performed by girls and women, if done with the old customary plain tissue wraps, is more or less laborious. Then, after the sheet has been pre-formed to the apple, as mentioned, the sheet is closed about the apple and the ends of the sheet are given a slight twist to secure them together. But, due to reflex action of the old type of fruit wrap, of low pliability, the ends of the wrap tend to spring away from the apple, leaving a substantial part thereof uncovered, and unprotected. When such occurs, the packer, in order to hold the ends of the fruit wrap together, would give them an extra, tighter twist, which consumes extra time and tends to slow up the packing of the fruit.

Lack of elasticity is another serious objection to plain tissue fruit wrap. It frequently causes the fruit wrap to tear while being wrapped around the fruit, thus requiring another sheet to be substituted for the one torn, which not only appreciably wastes wraps, but, by requiring re-wrapping of the fruit, slows up the packing operation.

Low absorptivity is another and most serious objection to the making of fruit wrap of plain tissue. As mentioned, the amount of preservative oil with which the tissue must be impregnated, in order to render the wrapping of the fruit effective as a protection, has been definitely determined, and fruit wrap is required to be impregnated with a definite amount of preservative oil in accordance with a fixed standard. But if plain tissue be impregnated with the required amount of oil, an excess of oil is clearly shown on the surfaces of the sheet; because a large amount of the preservative oil is not absorbed by the fibers of ordinary fruit wrap, but is merely held in the areas surrounding the fibers by capillarity.

Oily appearance of the fruit wrap is highly objectionable, both to the fruit packers and to the consuming public. Further, surface oiliness causes sticking of the fruit wrap sheets together, which impedes the wrapping operation. Fruit wraps are usually stacked close to the packer, who pulls off the top sheets as needed for wrapping. With the plain tissue fruit wrap impregnated with the said required relatively high amount preservative oil, this pulling off of the top sheets is frequently hindered because of the stickiness of the wraps. The packer, in consequence, occasionally has to stop to separate one sheet from the other, since otherwise there would be appreciable waste in the use of two or more wraps around a single piece of fruit. This also slows up the packing operation. On the other hand, when packing with my improved fruit wrap, all the difficulties above mentioned are eliminated.

I attain the object of my invention by loosening up or fluffing the fiber entanglements of the sheet, while in the process of making, so as to cause voids therein; in other words, cause the loosely entangled fibers to enshroud voids which will take up by absorption, and hold the required, relatively high percentage of fruit preservative oil per ream weight of the tissue paper. This result may be attained by any convenient means applied in the making of the sheet, as, for example, creping it, and then impregnating the sheet by devices provided in paper making machines, these operations being diagrammatically illustrated by the accompanying drawing; and finally passing the impregnated sheet thru a calender stack, giving the sheets 2 or 3 nips, thereby matting down the surface fibers of the sheet and thus closing its pores, and thus seal in the sheet the oil with which impregnated.

In the drawing, Fig. 1 represents diagrammatically a portion of a paper-making machine equipped with devices for creping, thus fluffing or loosening up the fiber entanglement and causing the fiber enshrouded voids within the sheet capable of absorbing and holding within them the said required amount of preservative oil; and Figs. 2 and 3 illustrate graphically the physical differences in density of a plain, uncreped tissue sheet, that is a tissue sheet formed by the customary process of making and having its surface fibers firmly matted or pressed down by calendering of the tissue sheet, which is represented by Fig. 2, and a tissue sheet whose fiber entanglements have been fluffed or loosened up—as done by creping the sheet—in order to produce in the sheet fiber enshrouded voids capable of absorbing and holding the required quantity of oil, which sheet is represented by Fig. 3; Figs. 2 and 3 being drawings reproducing microscopic photographs of longitudinal sections of tissue papers, plain and creped, respectively, as mentioned, and photostatically highly magnified.

The tissue sheet $t$ is assumed to have entered between the press rolls $a$ and to be traveling in the direction indicated by the arrow, and entering between the pressure roll $c$ and cold drier $d$. While running over the latter the tissue $t$ is creped by a doctor $e$, thence passes over carrier rolls $f$ to the drier section $g$; thence passes under spring roll $h$ over the oiling roll $i$, which runs in a trough of oil $j$; and the web thence passes thru 2 or 3 nips of the calender stack $k$ for pressing or matting down the surface fibers of the sheet sufficiently to close the sheet's pores, and the finished fruit wrap may then be conducted to a reel cooperating with reel-drum $m$.

The tissue so produced has a soft finish and neat appearance. It is pliable and not tinny or resilient like customary fruit wraps in present use. Furthermore, my improved fruit wrap will readily absorb the required, relatively large amount of preservative oil, and hold this oil entirely within the pores of its body without having oily or sticky surfaces. An ordinary tissue sheet has a dense formation. This fact is evidenced by Fig. 2, which shows a drawing of a microscopic photograph of a section produced by cutting an ordinary tissue sheet lengthwise with a sharp knife and then highly magnifying this microscopic photograph of the severed edge.

On the other hand, creping of a tissue sheet fluffs up its fibers and produces a looser fiber entanglement at the crepes, and thus causes innumerable voids in the sheet to be enshrouded in the fibers, by which the required larger quantity of oil is readily absorbed and held by the sheet. This fact is evidenced by Fig. 3, which shows a drawing of a microscopic photograph of a section of a creped tissue sheet produced by cutting the sheet lengthwise with a sharp knife, and then highly magnifying this microscopic photograph of the severed edge. The lighter portions $v$ of Fig. 3 indicate the voids. The looseness or fluffiness of the fibers of the creped tissue sheet, Fig. 3, as compared with the usual compressed plain tissue sheet, Fig. 2, is apparent.

I have further proved the greater absorptivity of a creped tissue sheet, and thus its capability for holding the required amount of preservative oil by the following tests:

A sample 4 x 4 inches of a creped tissue sheet was weighed on a Schopper 4 x 4 scale and then immersed for exactly two minutes in a tray of "Nujol" oil. The sample was then removed, and a glass stirring rod was run down both sides of the paper, the sample was then placed between two sheets of 32# standard newsprint and blotted. This blotting operation was repeated three times using fresh sheets of newsprint each time. After the last blotting the sheets and blotter were run twice through a rubber wringer under light pressure. The sample was then re-weighed and the percent oil absorption calculated from the weight increase. The weight increase showed the sheet to hold the relatively large, required amount of preservative oil; nevertheless, the surfaces of the sheet gave no evidence of undue impregnation, were not oily in appearance, nor sticky to the touch. Furthermore, the strength of the sheet was not reduced. Furthermore, the creping of the tissue sheet imparts to its surface certain roughness which contributes to preventing sheets sticking together.

In practicing my invention I have obtained best results by using tissue of 12 to 14 lbs. per ream, giving the sheet 2 or 3 nips—preferably 3 nips—finish in the calender stack of the paper-making machine, in order to mat or press down the surface fibers of the sheet and close its pores, and thus seal therein the oil which the sheet has absorbed.

The tissue so produced has an ample margin of strength against splitting or tearing in the operation of wrapping the fruit, as determined by me in Mullen and Tear tests to which I subjected the fruit wrap produced according to my invention.

The pliability of my fruit wrap facilitates the fruit wrapping operation, as mentioned. The softness of the web of my fruit wrap also facilitates the packing of the fruit more firmly in the box in which it is shipped. At the same time serves to reduce bruising of the fruit by the jars to which the boxes containing the fruit are subjected in shipment. The protection of the fruit against bruises in transit is brought about by the fact that my fruit wrap does not cling closely to the surface of the fruit. The roughness presented by the faces of the sheet, due to its creping, causes a film of air to be left entrapped between the sheet and fruit. This introduces a cushioning effect between the pieces of fruit and helps to prevent bruising of the fruit in transit; and the preventing of bruising reduces decay due to bruises, and enables the fruit to be shipped longer distances.

The described means for producing my fruit wrap and likewise the impregnating liquids used may, of course, be varied without departing from the principle of my invention.

I claim:

1. As an article of manufacture, a fruit wrap consisting of a crimped thin tissue sheet having loosely entangled fibers enshrouding innumerable voids holding by absorption an oleaginous material in amount not less than approximately 15% by weight of tissue, the surface fibers of the sheet being lightly matted down thereby closing the pores thereof and sealing the impregnating material therein.

2. As an article of manufacture, a fruit wrap consisting of a crimped thin tissue sheet having loosely entangled fibers enshrouding innumerable voids holding by absorption an oleaginous material of predetermined amount, the surface fibers of the sheet being lightly matted down thereby closing the pores thereof and sealing the impregnating material therein.

3. As an article of manufacture, a fruit wrap consisting of a crimped thin tissue sheet having loosely entangled fibers enshrouding innumerable voids holding by absorption an oleaginous material in an amount approximating 15% to 17½% of the weight of the tissue, the surface fibers of the sheet being lightly matted down thereby closing the pores thereof and sealing the impregnating material therein.

4. The article of manufacture described by claim 5 with said fruit wrap being further characterized by retaining the oleaginous material entirely within its pores and being substantially devoid of reflex action tending to separate the fruit wrap from the fruit inclosed therein.

5. The method of making a fruit wrap which consists in forming a tissue sheet of loosely entangled fibers enshrouding voids, capable of absorbing and holding a predetermined amount of oleaginous material, impregnating the sheet by absorption with oleaginous material, and then lightly matting down the surface fibers of the tissue sheet to close the pores thereof and thus seal the impregnating material therein.

6. The method of making a fruit wrap which consists in crimping the tissue sheet in the process of making, thereby to disentangle the fibers at the crimps and produce fiber enshrouded voids, capable of absorbing and holding a predetermined amount of oleaginous material, impregnating the sheet by absorption with oleaginous material, and then lightly matting down the surface fibers of the tissue sheet to close the pores thereof and thus seal the impregnating material therein.

7. The method of making a fruit wrap which consists in crimping the tissue sheet in the process of making, thereby to disentangle the fibers at the crimps and produce fiber-enshrouded voids capable of absorbing and holding a predetermined amount of oleaginous material, impregnating the sheet by absorption with oleaginous material in an amount not less than approximately 15% of the weight of the tissue, and then lightly matting down the surface fibers of the tissue sheet to close the pores thereof and thus seal the impregnating material therein.

8. The method of making a fruit-wrap which consists in crimping the tissue sheet in the process of making, thereby to disentangle the fibers at the crimps and produce fiber-enshrouded voids capable of absorbing and holding a predetermined amount of oleaginous material, impregnating the sheet by absorption with oleaginous material in an amount approximating 15% to 17½% of the weight of the tissue, and then lightly matting down the surface fibers of the tissue sheet to close the pores thereof and thus seal the impregnating material therein.

GEORGE W. CHARTERS.